Figure 1:
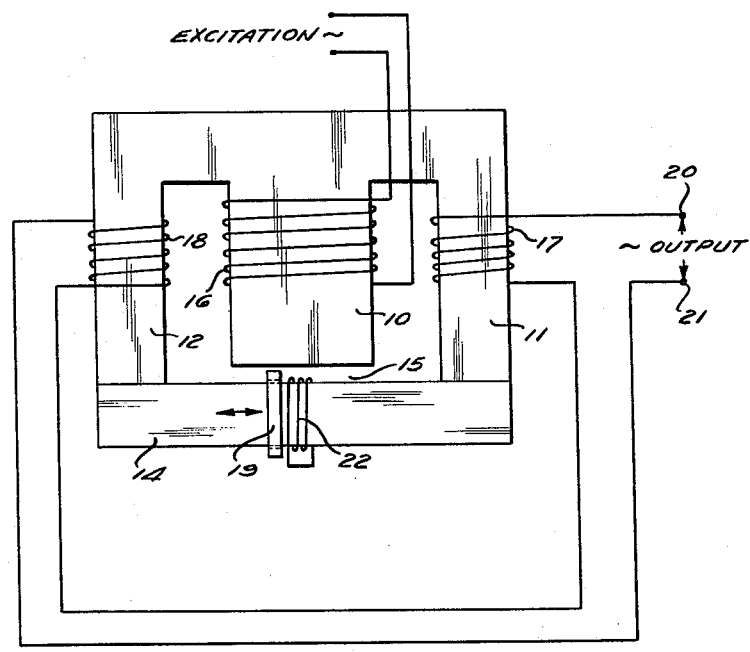

June 16, 1964   J. R. ANDRESEN   3,137,812
POSITION RESPONSIVE TRANSDUCER WITH A PERMANENT FLUX BARRIER
Filed Dec. 27, 1962

INVENTOR.
JORGEN R. ANDRESEN
BY
William J. Flynn
ATTORNEY

United States Patent Office 3,137,812
Patented June 16, 1964

3,137,812
POSITION RESPONSIVE TRANSDUCER WITH A PERMANENT FLUX BARRIER
Jorgen R. Andresen, Cleveland Heights, Ohio, assignor to Clevite Corporation, a corporation of Ohio
Filed Dec. 27, 1962, Ser. No. 247,647
6 Claims. (Cl. 323—51)

This invention relates to a position-responsive transducer or measuring device.

In United States Letters Patent Nos. 2,631,272, 2,697,214, 2,700,758 and 2,981,909, there have been disclosed various embodiments of a measuring device or transducer which produces an electrical output signal whose magnitude is a measure of the displacement of a movable element from a predetermined null or "zero" position.

The transducer has a ferromagnetic core providing two alternate paths for mangetic flux and a portion common to both flux paths, an air gap at said common portion, primary winding means on the core, secondary winding means having two different portions on the core at said two alternate flux paths and connected in series opposition, and a flux barrier movable in the air gap to control the division of flux between the two alternate flux paths in the core. The flux barrier is in the form of a shorted turn or loop of electrically conductive, non-magnetic material. When a suitable A.C. excitation signal is applied to the primary winding means, the net output voltage appearing across the secondary winding means is a measure of the displacement of the flux barrier loop from a predetermined null position along the air gap, in which the voltage induced across the two different portions of the secondary winding means cancel each other.

Such transducers have shown excellent linearity over an acceptably wide range of movement of the movable flux barrier from its null position. That is, the net output voltage varied substantially linearly with the displacement of the movable flux barrier from its null position.

The present invention is directed to a novel arrangement for extending the range of linearity of the transducer, so that its output voltage will vary substantially linearly with the displacement of the movable flux barrier from its null position over a substantially greater displacement range than was possible heretofore.

In accordance with the present invention, the linearity range of the transducer is extended by providing a region of increased magnetic reluctance in the transducer at the null position along the air gap. Preferably, this increased magnetic reluctance is produced by a permanent flux barrier surrounding a narrow region of the core at this location.

It is an object of this invention to provide a novel and improved position-responsive transducer or measuring device.

It is also an object of this invention to provide such a transducer or measuring device having an extended range of linearity.

Another object of this invention is to provide such a transducer or measuring device having improved linearity at the extremes of movement of its movable member.

Further objects and advantages of this invention will be apparent from the following detailed description of a presently-preferred embodiment, which is shown schematically in the accompanying drawing.

Figure 2:
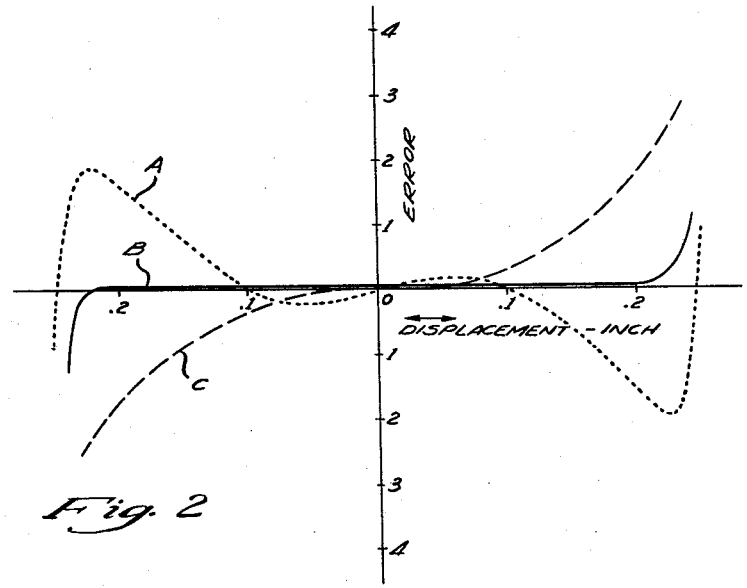

In the drawing:

FIGURE 1 is a schematic elevational view of a transducer or measuring device embodying the present invention; and FIGURE 2 is a graphic representation of the error, or deviation from linearity, plotted against the displacement of the movable flux barrier from its null position in the transducer, for a transducer which is compensated in accordance with the present invention and similar transducers which are under-compensated and over-compensated, respectively.

Referring first to FIGURE 1, the particular position-responsive transducer illustrated schematically therein is of the general type shown in U.S. Patents Nos. 2,631,272, 2,697,214, 2,700,758 and 2,981,909. It comprises a ferromagnetic core having a center leg 10 and a pair of outer legs 11 and 12 on opposite sides of the center leg. At its upper end in FIGURE 1 the core has a top leg 13 joining the upper ends of both of the outer legs 11 and 12 to the upper end of the center leg 10. At its lower end in FIGURE 1, the core has a bottom leg 14 joining the lower ends of the outer legs 11 and 12 and spaced from the lower end of the center leg 10 by an air gap 15. A primary winding 16 is wound around the center leg of the core. Secondary windings 17 and 18 are wound individually around the respective outer legs of the core. The secondary windings are connected in series bucking relationship. That is, the respective voltages induced across the individual secondary windings subtract, one from the other.

A movable flux barrier member 19 is disposed in the air gap 15. Preferably this flux barrier member is a shorted turn or loop of electrically conductive, non-magnetic material, such as copper or brass, extending loosely around the bottom core leg 14 and freely slidable lengthwise of the air gap 15, i.e., in a direction toward one or the other of the outer legs 11 and 12.

The two outer legs 11 and 12 and the respective adjoining portions of the top leg 13 provide two alternate paths for magnetic flux in the core, while the center leg 10 is common to both of these flux paths. The bottom leg 14 completes these two different flux paths through the core from the respective outer legs 11 and 12 back to the center leg 10 across the air gap 15.

In the operation of this transducer, when a suitable alternating current signal is applied to the primary winding 16 alternating magnetic flux is induced in the center leg 10 of the core, flowing across the air gap 15 and dividing there, part going by way of core leg 14 to the outer core leg 11 and the remainder going by way of core leg 14 to the outer core leg 12 before returning via the top core leg 13 to the upper end of the center core leg 10. The flux in each outer core leg 11 or 12 induces a voltage across the corresponding secondary winding 17 or 18. Since the secondary windings are connected in series opposition, the net voltage across the secondary output terminals 20 and 21 is the difference between the individual voltages across the respective secondary windings 17 and 18.

The movable flux barrier member 19 tends to prevent any change in the flux linkages through itself. Therefore, it acts to prevent the flow of any appreciable amount of alternating flux through the bottom leg 14 of the core at the position of the flux barrier member 19. Accordingly, the position of the flux barrier member 19 along the air gap 15 determines the division of flux between the outer legs 11 and 12 of the core, and thus the respective magnitudes of the voltages induced across the individual secondary windings 17 and 18.

When the movable flux barrier member 19 is centered mid-way along the air gap, the flux will divide equally between the respective outer legs 11 and 12 of the core. If, for example, the respective secondary windings 17 and 18 are identical, then the voltages induced across them will be equal and, since the secondary windings are connected in series bucking relationship, the net output voltage will be zero. Therefore, this centered position of the flux barrier member in the particular example under discussion is a null or zero output position.

When the movable flux member 19 is positioned to one side or the other of this centered position, the flux across the air gap 15 will divide between the respective outer core legs 11 and 12 in proportion to the displacement of the flux barrier member 19 from its centered position. Consequently, in the particular example where the secondary windings are identical, the voltage induced across one of the secondary windings will be greater than the voltage induced across the other secondary winding, so that some finite net voltage is produced across the output terminals 20 and 21. The phase of this net voltage indicates the direction of the off-center position of the flux barrier member 19. The magnitude of this net voltage is proportional to the displacement of the flux barrier member 19 from its null position.

The core 10–14 which, for the sake of simplicity, is shown in FIG. 1 as a one-piece structure, actually is constructed of separate pieces which are assembled together to provide the complete core structure shown. Desirably, the core structure may be composed of a laminated I core, which provides the core leg 14, and a laminated E core, which provides the core legs 10, 11, 12 and 13.

In the operation of such transducers, excellent linearity has been obtained except when the flux barrier 19 is near either end of the air gap 15. In such positions of the flux barrier, the net output voltage appearing across the output terminals 20, 21 is excessively high and is no longer substantially linearly proportional to the displacement of the flux barrier from its null position. The present invention is directed to a novel arrangement for overcoming this effect, so that the linear response of the transducer is extended over a greater range of displacement of the movable flux barrier 19 from its null position.

Referring to FIGURE 1, in accordance with the present invention this correction or compensation is provided by a permanent flux barrier on the I core 14 at the null position of the flux barrier loop 19 along the air gap 15. In practice, this permanent flux barrier may comprise a multi-turn winding 22, having its opposite ends connected to each other, or a shorted single turn loop, of electrically conductive, non-magnetic material, preferably copper, surrounding the I core 14 at the null position.

This permanent flux barrier 22 produces a narrow region of increased magnetic reluctance in the transducer at the null position of the movable flux barrier 19. Due to this higher reluctance region, excessive flux does not pass through the I core 14 in the direction away from the movable flux barrier 19 when the latter is positioned close to one end or the other of the air gap 15. It is believed that excessive flux under these conditions was responsible for the non-linearity in the response of previous transducers of this general type when the movable flux barrier was displaced relatively far from its null position.

The electrical resistance of the shorted, permanent flux barrier 22 determines the increased magnetic reluctance which it provides in the transducer. If its resistance is too high, it will not increase the magnetic reluctance at the null position enough, and therefore the transducer will not be sufficiently compensated. Conversely, if its resistance is too low, it will increase the magnetic reluctance at the null position too much and thereby will overcompensate the transducer. Accordingly, the electrical resistance of the permanent flux barrier 22 should be so chosen as to avoid either under-compensation or over-compensation.

Referring to FIGURE 2, the dotted-line curve A shows the error, or deviation from linearity, of a transducer of the type shown in FIGURE 1, but lacking the permanent flux barrier 22 or having such a permanent flux barrier with an excessively high electrical resistance, so that the transducer is under-compensated. The error is ploted in arbitrarily chosen units.

The full-line curve B in FIGURE 2 represents the error curve for the same transducer provided with a permanent flux barrier 22 whose electrical resistance is such as to provide optimum compensation, so that the range of substantial linearity of the transducer is extended to more than 0.2 inch on each side of the movable flux barrier's null position. In actual practice, the transducer's deviation from linearity has been kept below ±.0075% over a total displacement range of 0.4 inch for the movable flux barrier 19 (0.2 inch on either side of its null position).

The dashed-line curve C in FIGURE 2 represents the error curve for the same transducer provided with a permanent flux barrier 22 at the null position whose electrical resistance is excessively low, so that it over-compensates the transducer.

While a presently-preferred embodiment of this invention has been described in detail and illustrated in the accompanying drawing, it is to be understood that various modifications, omissions and refinements which depart from the disclosed embodiment may be adopted without departing from the spirit and scope of this invention.

I claim:

1. In a position-responsive transducer comprising a magnetic core having an air gap therein and having a leg at one side of said air gap through which flux may flow in opposite directions away from the air gap, primary winding means on the core for inducing flux therein to flow across said air gap, secondary winding means having two different portions thereof on the core inductively associated with the oppositely directed flux paths through the core and connected to produce an A.C. output signal proportional to the difference between the individual voltages induced across said different portions, and a flux barrier movable along said air gap, from a null position in which the output signal is substantially zero, to vary the respective amounts of flux flowing in opposite directions through said one leg, the improvement which comprises: means providing a permanent flux barrier on said one leg at the null position of the movable flux barrier.

2. In a position-responsive transducer comprising a magnetic core having an air gap therein and having a leg at one side of said air gap through which flux may flow in opposite directions away from the air gap, primary winding means on the core for inducing flux therein to flow across said air gap, secondary winding means having two different portions thereof on the core inductively associated with the oppositely directed flux path through the core and connected to produce an A.C. output signal proportional to the difference between the individual voltages induced across said different portions, and a flux barrier movable along said air gap, from a null position in which the output signal is substantially zero, to vary the respective amounts of flux flowing in opposite directions through said one leg, the improvement which comprises: a shorted, electrically-conductive, non-magnetic member surrounding said one leg at a narrow region of said one leg at the null position of the movable flux barrier.

3. A position-responsive transducer comprising a magnetic core having a center leg terminating at one end in an end face which extends continuously through substantially the entire cross-section of said center leg, a pair of opposite outer legs connected to the opposite end of said center leg, and an additional leg extending between the opposite ends of said outer legs and in close spaced confronting relationship to said end face of said center leg throughout the extent of said end face and defining with said end face an air gap, a primary winding on said center leg for inducing flux therein to flow across said air gap, a pair of secondary windings on said outer legs and connected in series opposition, a flux barrier loop surrounding said additional core leg and having a portion in said air gap, said flux barrier loop being movable along said air gap, from a null position in which the respective voltages induced across said secondary windings substantially cancel each other, to control the division of flux between said outer core legs, and a permanent flux barrier on said additional leg at said null position.

4. A position-responsive transducer comprising a magnetic core having a center leg, a pair of opposite outer legs connected to one end of said center leg, and an additional leg extending between the opposite ends of said outer legs and spaced from the opposite end of said center leg by an air gap, a primary winding on said center leg for inducing flux therein to flow across said air gap, a pair of secondary windings on said outer legs and connected in series opposition, a flux barrier loop surrounding said additional core leg and having a portion in said air gap, said flux barrier loop being movable along said air gap, from a null position in which the respective voltages induced across said secondary windings substantially cancel each other, to control the division of flux between said outer core legs, and a permanent flux barrier on said additional leg at said null position, said permanent flux barrier being a shorted, electrically conductive, non-magnetic member surrounding said additional leg.

5. The transducer of claim 4 wherein said non-magnetic member is a multi-turn winding.

6. In a position-responsive transducer comprising a magnetic core having a magnetic center leg terminating at one end in an end face which extends continuously through substantially the entire cross-section of said center leg, an additional magnetic leg in close spaced, confronting relationship to said end face throughout the extent of said end face and defining with said end face an air gap, and additional magnetic portions which extend respectively between the opposite end of said center leg and the opposite extremities of said additional leg and which provide with said additional leg two different flux paths through the core between the air gap and said opposite end of the center leg, primary winding means on the center leg for inducing flux therein to flow across the air gap, secondary winding means having two different portions thereof on the core which respectively are inductively associated with said two different flux paths through the core and are connected to produce an A.C. output signal proportional to the difference between the individual voltages induced across said different portions, and a flux barrier movable along said air gap, from a null position in which the output signal is substantially zero, to vary the respective amounts of flux flowing in said two different flux paths through the core, the improvement which comprises: means providing a permanent flux barrier on said additional leg at the null position of the flux barrier.

References Cited in the file of this patent
UNITED STATES PATENTS

| | | |
|---|---|---|
| 2,631,272 | Smith | Mar. 10, 1953 |
| 3,099,823 | Bobula et al. | July 30, 1963 |
| 3,101,462 | Swainson | Aug. 20, 1963 |